(No Model.)
J. GAYNER
MOLD FOR GLASS BATTERY JARS.
No. 478,792. Patented July 12, 1892.
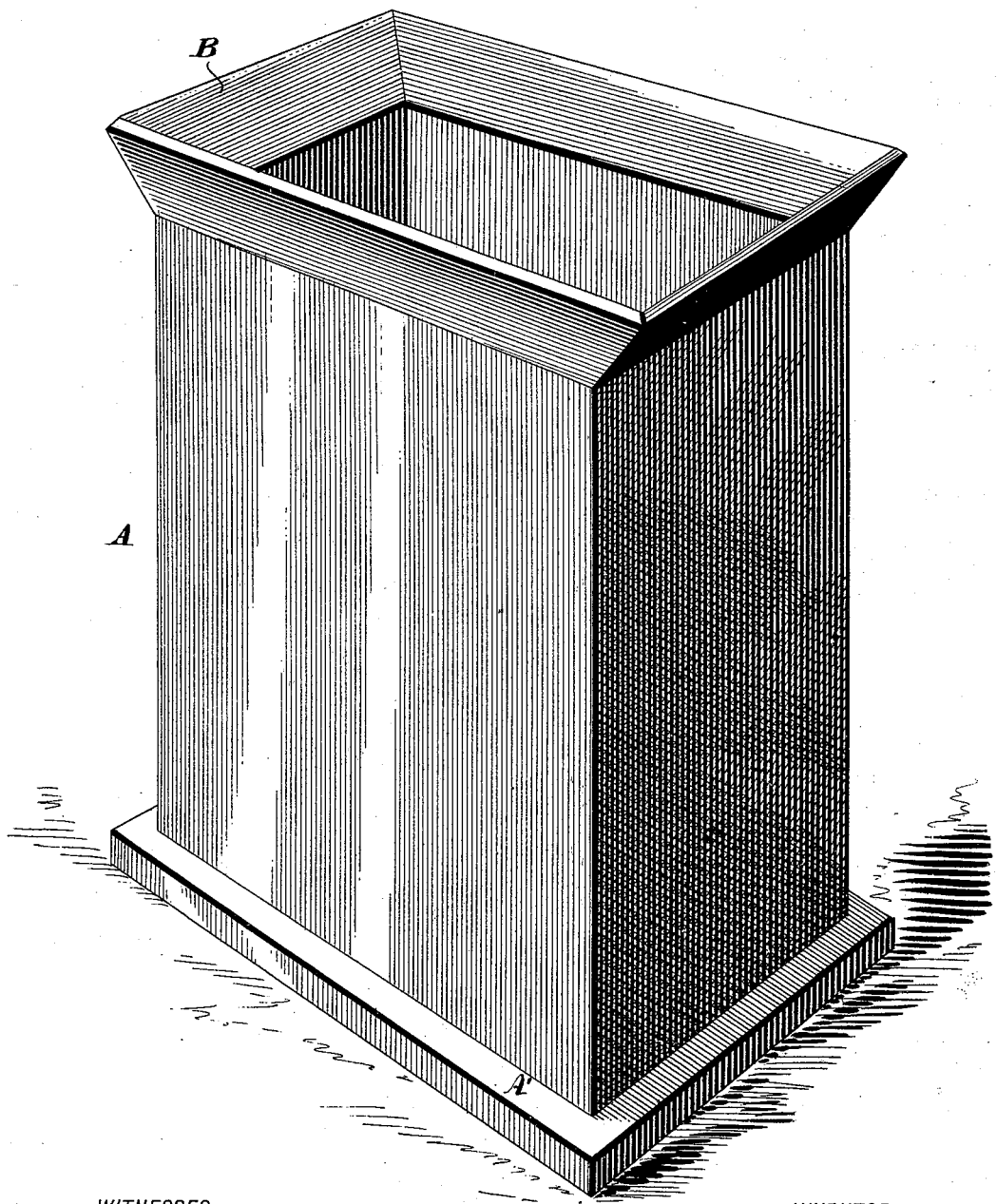

UNITED STATES PATENT OFFICE.

JOHN GAYNER, OF SALEM, NEW JERSEY.

MOLD FOR GLASS BATTERY-JARS.

SPECIFICATION forming part of Letters Patent No. 478,792, dated July 12, 1892.

Application filed November 9, 1891. Serial No. 411,248. (No model.)

*To all whom it may concern:*

Be it known that I, JOHN GAYNER, a citizen of the United States, residing at Salem, in the county of Salem and State of New Jersey, have invented a new and useful Improvement in Molds for Glass Battery-Jars, which improvement is fully set forth in the following specification and accompanying drawing.

My invention consists in providing a mold for glass battery-jars, formed of a hollow block and provided with a funnel at the top thereof, whereby overflowing of the bulbs of glass from which the jars are made is prevented and the bulbs may be formed so large as to free the molds, thus producing uniform work, as will be hereinafter set forth.

The figure represents a perspective view of a mold embodying my invention.

Referring to the drawing, A designates a mold for the purpose stated, formed of a hollow block having a base portion A' extending beyond each of the vertical main portions of the sides thereof. The top portion of each of the sides is outwardly inclined, forming a flaring or widened mouth or funnel B, the sides of which are plane.

In blowing glass battery-jars the difficulty heretofore has been in getting the glass evenly distributed, because it is required to blow the bulb of glass the width of the narrowest diameter of the mold. Consequently the corners of the jars are thinner than the sides thereof. Should a larger bulb be used, it would overflow at the top of the mold and part of the same be lost, the main portion, however, being insufficient to accomplish perfect work; but by the use of the funnel B, I may use a larger bulb than heretofore, the same being equal to the inner diameter of said funnel, so that the bulb impacts upon the funnel, stretches down the slant or flaring sides of the same, and fully enters the mold, so that there is sufficient metal to be distributed equally around the mold, thus producing uniformity of work.

Having thus described my invention, what I claim to be new, and desire to secure by Letters Patent, is—

A mold for glass battery-jars, consisting of a hollow block with a base portion extending beyond the vertical main portion of the sides of the body thereof and a flaring mouth having plane sides at the top of the body portion, said parts being combined substantially as described.

JOHN GAYNER.

Witnesses:
   N. H. HAZELTON,
   I. O. ACTON.